March 15, 1966 W. E. SONNTAG, JR 3,240,628

THERMOELECTRIC PANEL

Filed June 14, 1962

INVENTOR.
WALLACE E. SONNTAG, JR.
BY Frank N. Decker Jr.
ATTORNEY.

3,240,628
THERMOELECTRIC PANEL
Wallace E. Sonntag, Jr., Fayetteville, N.Y., assignor to Carrier Corporation, Syracuse, N.Y., a corporation of Delaware
Filed June 14, 1962, Ser. No. 202,490
3 Claims. (Cl. 136—4)

This invention relates to thermoelectric panels, more particularly to an improved thermoelectric panel construction which minimizes the adverse effect of differential thermal expansion.

Thermoelectric panels generally comprise a plurality of pairs of thermoelectric elements of different thermoelectric power arranged in an electrical circuit. As is known, the pairs of thermoelectric elements may be used either for generating electricity, or for effecting heat pumping, dependent upon whether the Seebeck or Peltier effects are employed. The thermoelectric elements are generally electrically connected by bridges which are sandwiched between and electrically insulated from a heat absorbing plate and a heat dissipating plate, said plates being arranged in heat exchange relationship with the bridges.

In practical installations, particularly where the panels are utilized for generation of electrical power, the temperature differences between the heat absorbing and heat dissipating sections of the panel cause greater thermal expansion of the heat dissipating plate than the heat absorbing plate and therefore plate warpage becomes a problem resulting in a disturbance of the electrical connections between the circuit components, interfering with efficiency of heat transfer, and generally affecting the performance of the panel.

A primary object of this invention is to provide an improved thermoelectric panel.

An object of this invention is to provide an improved construction of the heat transfer plates of a thermoelectric panel so as to enable the plates to accommodate distortions produced by temperature differentials without affecting electrical connections, heat transfer efficiency, or structural strength.

These and other objects of the invention which will become hereafter apparent are achieved in the illustrated embodiment thereof by forming a plate member with a plurality of parallel first flexible expansion joints in the form of linear depressions of arcuate shape. The arcuate cross-section of the depressions serves to accommodate expansion in a direction perpendicular to the direction of the linear depression. A second plurality of parallel flexible expansion joints in the form of linear depressions are arranged at an angle to said first linear depressions, and intersecting therewith. As a result of these depressions, stresses in any direction in the plane of the plate are accommodated.

An important feature of the invention resides in the fact that the intersecting linear expansion joints may be arranged to define the desired layout of thermoelectric elements in the panel so as to implement panel assembly.

Figure 1:
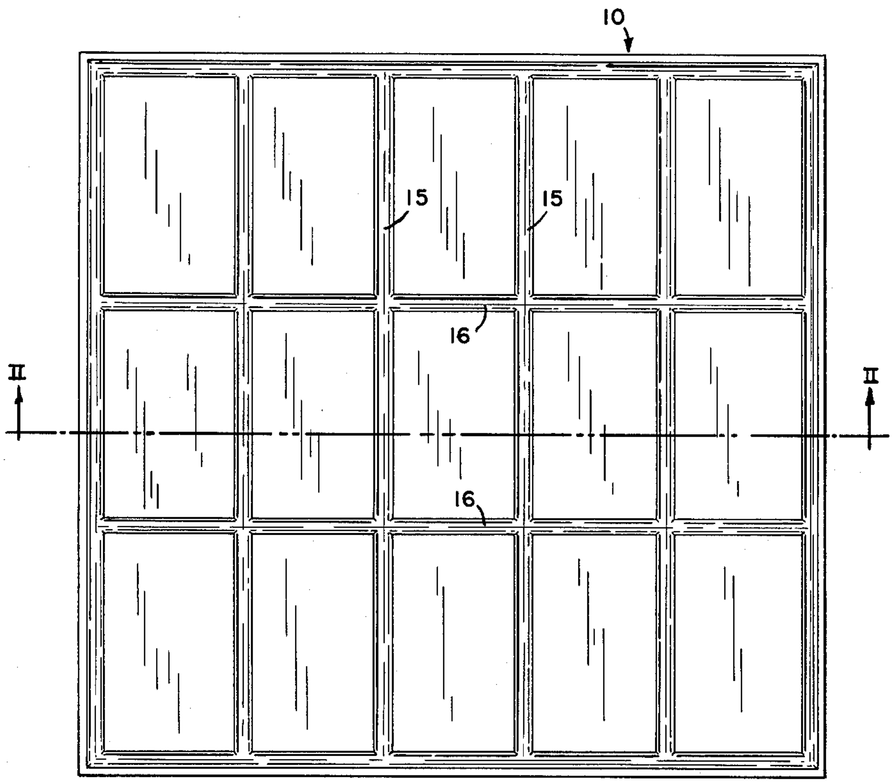
Figure 2:
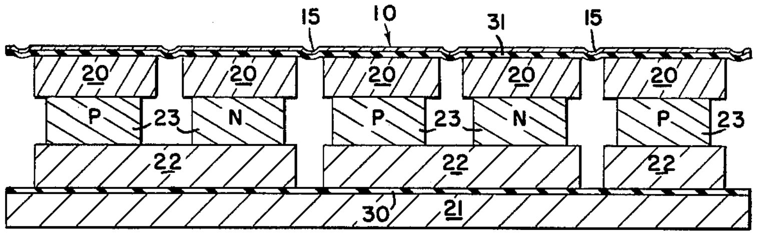

These and other features of the invention will become apparent with reference to the following description and drawing, wherein:

FIGURE 1 is a top plan view of a plate constructed in accordance with the teachings of this invention; and FIGURE 2 is a cross-sectional view taken on line II—II of FIGURE 1.

Referring to the drawing, the novel plate 10 is formed of a flexible, sheet-like material such as copper, stainless steel or the like material preferably having high thermal conductivity. A first group of generally parallel, flexible, expansion joints 15 are arranged to extend vertically across the plate as viewed in the drawing. As best seen in FIGURE 2, flexible expansion joints 15 may comprise linear depressions having a semi-arcuate cross-section, though it will be appreciated that a V-shaped or other kinds of cross-sectional configurations may be utilized, if desired. The semi-circular configuration is preferred because the die required for forming same is relatively simple, and there is little likelihood of damage of the material, and because the smooth transition curve minimizes material stresses. A second series of linear expansion joints 16 may extend horizontally across the plate 10, and intersect first linear expansion joints 15 at right angles thereto. Expansion joints 16 may be of the same form as joints 15. Additional flexibility may be provided by dimpling the point of intersection of linear flexible joints, if desired.

It will be understood that the particular arrangement and spacing of the expansion joints is dependent on the requirements of any particular panel. Panel fabrication is implemented by arranging the flexible joints so that they extend adjacent the region between spaced bridges 20. Thus as viewed in FIGURE 2, it will be seen that heat dissipating bridges 20 lie adjacent the regions between the linear depressions formed to produce the expansion joints 15. For maximum accommodation of thermal expansion by plate 10, it is desirable that flexible joints 15 surround the region of plate 10 which is adjacent each individual bridge 20.

The plate 10 may be utilized as the heat transfer plate of a thermoelectric panel shown schematically in cross-section in FIGURE 2. The panel shown in FIGURE 2 is of a type normally employed in electrical power generation having at least one flexible plate on either the hot or cold side of the panel and may comprise a relatively rigid heat source plate 21 arranged in heat transfer relationship but electrically insulated from a heat absorbing bridge 22 forming a part of the thermoelectric circuit including thermoelectric elements 23 "P" and 23 "N," the "P" and "N" referring respectively to semi-conductor materials of differing positive and negative thermoelectric powers with respect to each other.

It will be seen that plates 10 and 21 are generally parallel to each other, and that bridges 20 and 22 are spaced from each other and are disposed substantially parallel to their adjacent plates 15 and 21 respectively. Suitable insulation, such as mica sheets 30, 31 electrically insulate the bridges from their adjacent plates. Bridges 20 electrically connect thermoelectric elements 23 "P" and 23 "N" to form thermoelectric junctions of one type adjacent plate 10, and bridges 22 electrically connect the thermoelectric elements 23 "N" and 23 "P" in the reverse sense, for a given direction of current flow, to form thermoelectric junctions of another type adjacent plate 21. The bridges form heat transfer surfaces for absorption or dissipation of heat to or from their associated thermoelectric junctions.

By utilizing a heat transfer plate 10 of a thermoelectric panel such as shown schematically in FIGURE 2, it will be apparent that the panel assembly will be implemented because the flexible joints define the desired bridge locations, and that stresses due to differential thermal expansion in the panel will be accommodated by the flexible joints of the plate.

In FIGURE 2, the panel is shown to comprise a relatively rigid heat absorbing or heat sink plate 21 arranged in heat exchange relationship with heat absorbing bridges 22 which contact in conventional fashion the thermoelectric elements 23 "P" and 23 "N."

Where the panel is employed for generation of electricity, the temperature differentials between the heat source and the heat sink plates may exceed 1000° F.

As a result of this, the differential in plate expansion between the heat sink and heat source plates may result in tremendous distortions affecting electrical connections and heat transfer between panel components. By minimizing the effect of differential panel expansion through the use of expansion joints formed in the fashion indicated, the distortions due to expansion may be accommodated.

The intersecting, flexible, linear expansion joints accommodate stresses regardless of direction on the plate.

In assembly, the lands provided between the linear expansion joints serve to define the desired area of positioning of the bridges of the thermoelectric circuit.

It is thus seen that an improved plate structure has been evolved for use in fabricating thermoelectric panels serving to implement the assembly of the panel by the use of defined bridge lands, and additionally functioning to accommodate stresses due to temperature differentials.

The above disclosure has been given by way of illustration and may be otherwise embodied within the scope of the appended claims.

I claim:

1. In a thermoelectric panel having thermoelectric elements joined by bridges, a substantially flat plate member overlying the bridges and in heat transfer relationship therewith; a first flexible expansion joint formed in said plate member adjacent a bound of at least one of said bridges; a second flexible expansion joint formed in said plate member extending adjacent another bound of said bridges at an angle to said first expansion joint, said second joint intersecting said first expansion joint to permit flexure of said plate member in order to accommodate differential thermal expansion of said thermoelectric panel in any direction in the plane of said plate member.

2. A thermoelectric panel assembly comprising
a pair of spaced substantially flat plate members,
a plurality of thermoelectric elements disposed between said spaced plate members,
said thermoelectric elements being electrically connected to form thermoelectric junctions of different types adjacent the respective plate members, each of said junctions adjacent one of said plate members including a heat transfer surface portion disposed generally parallel to said one plate, said heat transfer surface portions being spaced from each other,
at least one flexible depression formed in said one plate and disposed between said spaced heat transfer surface portions, said plate member having a flexible depression extending in a plurality of directions in the plane of said plate member so as to impart flexibility to said plate member in all directions in the plane thereof thereby enabling said plate member to accommodate thermal expansion in any direction, and
said heat transfer surface portions each comprising a bridge member and each of the adjacent bridge members being entirely surrounded by a flexible depression.

3. A thermoelectric panel assembly comprising:
a pair of spaced substantially flat plate members,
a plurality of thermoelectric elements disposed between said spaced plate members,
said thermoelectric elements being electrically connected to form thermoelectric junctions of different types adjacent the respective plate members, each of said junctions adjacent one of said plate members including a heat transfer surface portion disposed generally parallel to said one plate, said heat transfer surface portions being spaced from each other,
at least one flexible depression formed in said one plate and disposed between said spaced heat transfer surface portions, said plate member having a flexible depression extending in a plurality of directions in the plane of said plate member so as to impart flexibility to said plate member in all directions in the plane thereof thereby enabling said plate member to accommodate thermal expansion in any direction, and
said heat transfer surface portions each comprising a bridge member and each adjacent bridge member being individually entirely surrounded by a flexible depression.

References Cited by the Examiner

UNITED STATES PATENTS

| | | | |
|---|---|---|---|
| 1,848,655 | 3/1932 | Petrik | 136—4.2 |
| 2,749,716 | 6/1956 | Lindenblad | 136—4.2 |
| 3,035,109 | 5/1962 | Sheckler | 136—4.2 |

FOREIGN PATENTS

| | | |
|---|---|---|
| 874,660 | 8/1961 | Great Britain. |

WINSTON A. DOUGLAS, *Primary Examiner.*

JOHN H. MACK, *Examiner.*

J. BARNEY, A. B. CURTIS, *Assistant Examiners.*